United States Patent [19]

Ishii et al.

[11] Patent Number: 4,988,165
[45] Date of Patent: Jan. 29, 1991

[54] OBJECT LENS DRIVING DEVICE

[75] Inventors: Mitsuo Ishii; Yukio Kurata, both of Nara; Hideyoshi Yamaoka, Osaka, all of Japan

[73] Assignee: Sharp Kabushiki Kaisha, Osaka, Japan

[21] Appl. No.: 356,136

[22] Filed: May 24, 1989

[30] Foreign Application Priority Data

May 25, 1988 [JP] Japan ............... 63-69064[U]

[51] Int. Cl.$^5$ ............................................. G02B 7/02
[52] U.S. Cl. ................... 350/245; 350/247; 350/252; 350/248
[58] Field of Search ............... 350/247, 255, 300, 319, 350/320, 245, 252, 257; 369/215, 223, 249, 45, 292, 75.2, 264, 181, 32, 111; 250/201; 360/82, 106; 354/293

[56] References Cited

U.S. PATENT DOCUMENTS

| 4,101,008 | 7/1978 | Frosch | 350/255 |
| 4,206,983 | 6/1980 | Nettman et al. | 354/293 |
| 4,538,882 | 9/1985 | Tanaka et al. | 350/255 |
| 4,571,026 | 2/1986 | Maruta | 350/255 |
| 4,707,754 | 11/1987 | Patel et al. | 360/106 |
| 4,766,583 | 8/1988 | Oinoue et al. | 350/247 |
| 4,811,320 | 3/1989 | Kawasaki et al. | 350/247 |
| 4,818,066 | 4/1989 | Nose | 350/247 |
| 4,838,649 | 6/1989 | Ichikawa et al. | 350/247 |
| 4,856,882 | 2/1989 | Oshima et al. | 350/500 |

FOREIGN PATENT DOCUMENTS

62-40627  2/1987  Japan .

Primary Examiner—Bruce Y. Arnold
Assistant Examiner—Thong Nguyen

[57] ABSTRACT

An object lens driving device causes partial rotation of movable members holding an object lens on an X-Y frame perpendicular to the optical axis of the object lens about a resilient hinge member as a fulcrum. The movable members are supported by base members. The hinge member interconnects the movable members and the base members. Electro-magnetic coils and magnets effectuate relative rotation of the movable members with respect to the base members about the hinge member. A rotational axis passing through the hinge member also passes through the position of center of gravity of the movable members and the balanced position of moment of inertia of the movable members.

9 Claims, 5 Drawing Sheets

OBJECT LENS DRIVING DEVICE

BACKGROUND OF THE INVENTION

1. Field of the Invention

This invention relates to an object lens driving device in an optical pickup device or a holographic device, wherein the position of the radiation of a light beam may be adjusted by displacing an object lens.

2. Description of the Background Art

Figure 1:
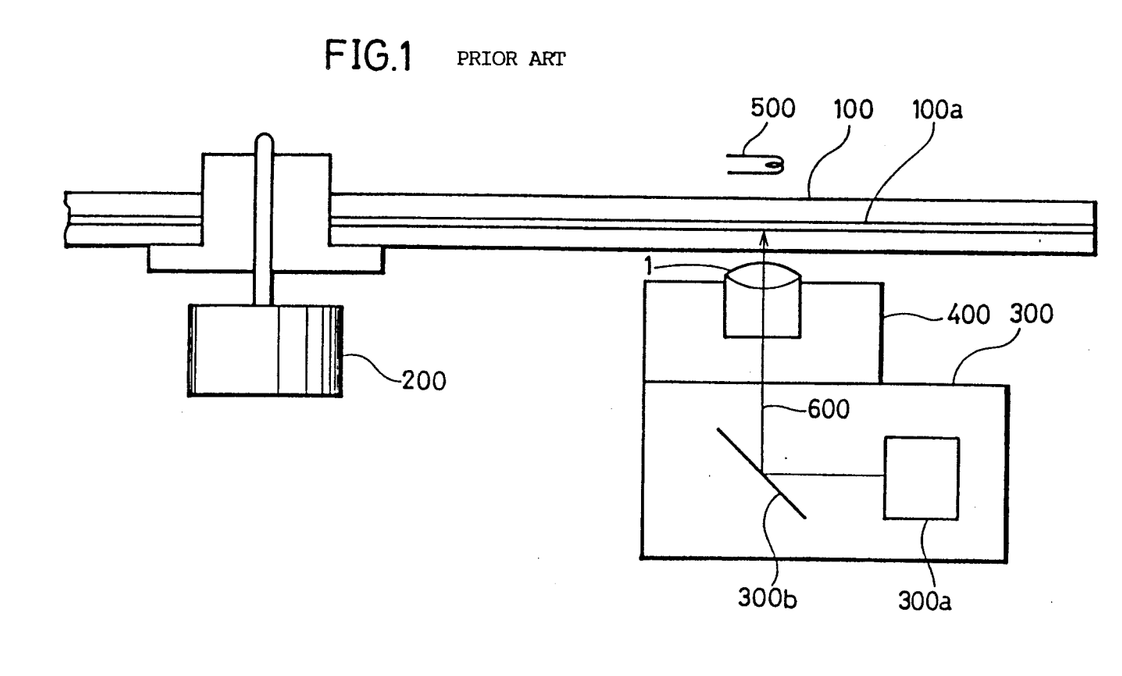
FIG. 1 is a diagrammatic side elevational view showing an example of an optical disk device forming the background of the present invention.

An example of an optical disk device forming a background of the present invention is explained by referring to FIG. 1, which is a diagrammatic side elevational view showing an example of the conventional optical disk device.

Referring to FIG. 1, an optical disk 100 is rotationally driven by an electric motor 200. A laser light 600 emitted from a laser light source 300a is reflected by a mirror 300b. The laser light 600 is then passed through an object lens 1 to converge on the surface of a disk recording medium 100a enclosed in the optical disk 100. In this manner, optical information recording/reproduction or erasure may be performed by light spots formed on the disk recording medium 100a. An object lens driving device 400 moves the object lens 1 both in the up and down direction and in the left and right direction to perform a follow-up control of the converging position of the laser light 600, that is, the position of formation of the light spot on a recording track on the disk recording medium 100a. An optical system including mainly the laser light source 300a and the mirror 300b is provided within a housing 300. An optical pickup device or a optical head is made up of the housing 300 and the object lens driving device 400. An electro-magnetic coil 500 produces a magnetic field for recording or erasure of the information on the disk recording medium 100a.

In the above described optical disk device, when the optical disk 100 is actuated, the information track sections on the optical disk are displaced in the up and down direction, that is, along the optical axis, during its rotation, on account of in-plane oscillations. The information track sections on the optical disk 100 are also displaced in the left and right direction, that is, along the radius of the disk, by the offset between the axis of rotation of the disk and the axis of the motor 200 driving the disk into rotation. The object lens 1 is moved along the optical axis or in the focusing direction with respect to the surface of the disk recording medium 100a of the disk 100 by the above described object lens driving device 400. The object lens 1 is also moved along the radius of the optical disk 100 or in the tracking direction by the object lens driving device 400. In this manner, the object lens 1 is displaced responsive to of the in-plane oscillations of the disk recording medium 00a or the offset rotation of the disk. In this manner, the laser light 600 may be perceptually accurately converged on the information track sections.

Figure 2:
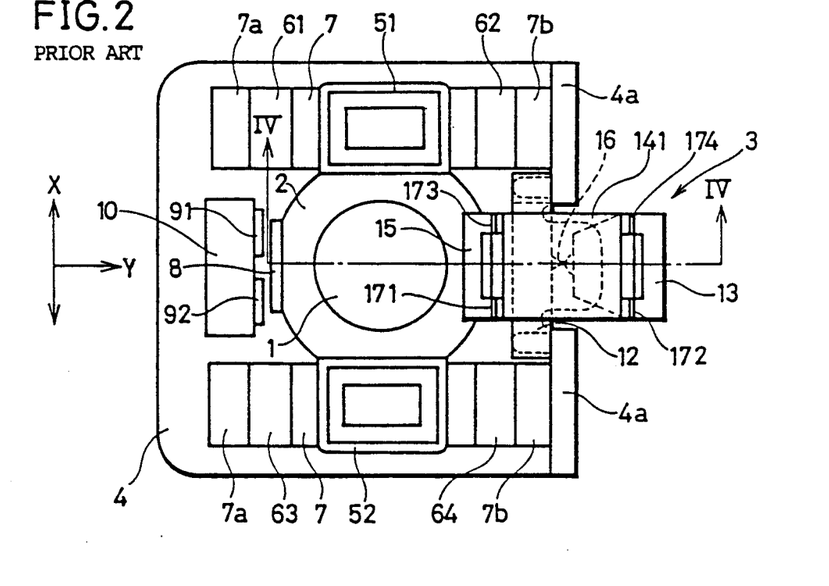
FIG. 2 is a plan view showing a conventional object lens driving device.
Figure 3:
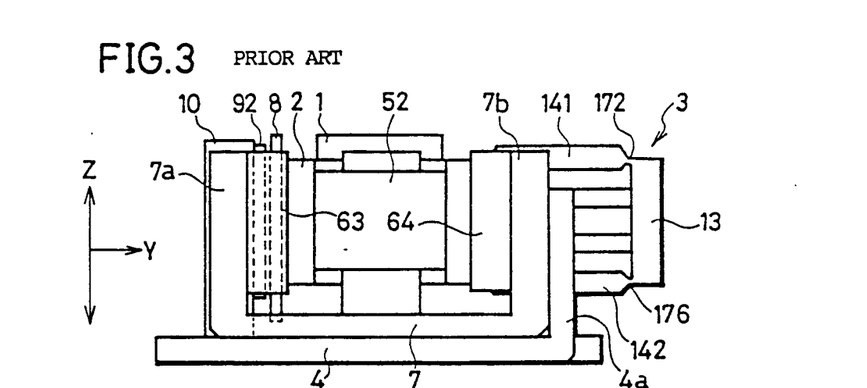
FIG. 3 is a side elevational view showing another conventional object lens driving device.
Figure 4:
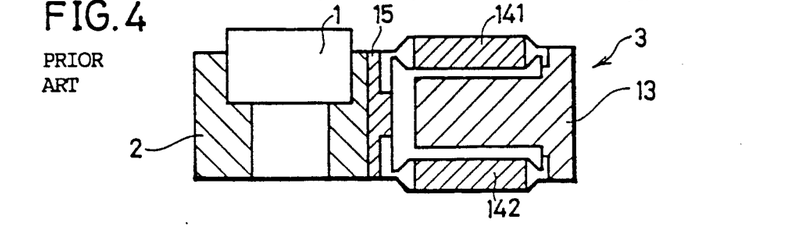
FIG. 4 is a partial cross sectional view taking along line IV—IV of FIG. 2.
Figure 7:
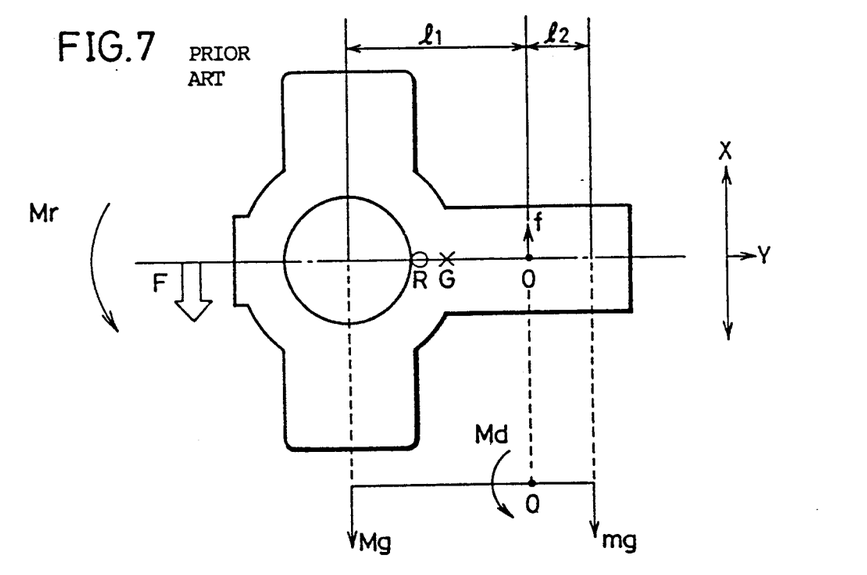
FIG. 7 is a plan view showing the rotational moment and the force acting on the partially rotated movable portion of the conventional object lens driving device.

The conventional object lens driving device is explained by referring to FIGS. 2 to 7. FIG. 2 is a plan view showing the conventional object lens driving device, FIG. 3 is a side elevational view showing the conventional object lens driving device, and FIG. 4 is a partial sectional view taken along lines IV—IV in FIG. 2. FIG. 5A is a plan view showing a movable supporting member forming a portion of the object lens driving device, FIG. 5B is a plan view showing the state in which the movable supporting member has been turned in the tracking direction, FIG. 6A is a side elevational view showing the movable supporting member, and FIG. 6B is a side elevational view showing the state in which the movable supporting member is translationally moved in the focusing direction. FIG. 7 is a plan view showing the rotational moment and the force acting on the movable portion in the conventional object lens driving device.

The object lens 1 of the optical system has its peripheral portion secured to an object lens holding member 2. The object lens holding member 2 has its one end along a direction shown by the arrow mark Y perpendicular to the tracking direction or the direction shown by the arrow mark X in FIG. 2 supported by a stand 4a of a base plate 4 through the movable supporting member 3. This base plate 4 is attached to the end of the main body of the optical pickup device. Thus, as shown in FIG. 1, the object lens driving device 400 is attached to the foremost part of the housing 300, so that the light beam is irradiated on the disk through the object lens 1.

At both ends in the tracking direction in the object lens holding member 2, that is, the direction shown by the arrow mark X, focusing coils 51, 52 are provided as the driving coils. On both ends of the focusing coils 51, 52 along the direction shown by the arrow mark Y, perpendicular to the tracking direction, magnets 61, 62; 63, 64 are provided with a suitable spacing from each other. These magnets 61, 62; 63, 64 are supported by both stand end sections 7a, 7b of a yoke 7 secured to the base plate 4 to constitute a magnetic circuit. Therefore, when the current is supplied through these focusing coils 51, 52, an electro-magnetic force is produced in the focusing direction, that is, in the direction shown by the arrow mark Z. This focusing direction coincides with the direction of the optical axis of the object lens.

At the other end of the object lens holding member 2 along the direction of the arrow mark Y perpendicular to the tracking direction, shown by the arrow mark X, there is provided a tracking coil 8 constituting a driving coil. A pair of electro-magnets 91, 92 are arrayed at a suitable distance from each other on a side facing to the tracking coil 8 secured to the object lens holding member 2. These magnets 91, 92 are supported by a yoke 10 secured to the base plate 4 to constitute a magnetic circuit. Thus, when the current is supplied to this tracking coil 8, the electro-magnetic force is generated in the tracking direction, that is, in the direction shown by the arrow mark X. This tracking direction coincides with radial direction of the optical disk irradiated with the light beam through the object lens 1.

Figures 5A, 5B, 6A, 6B:
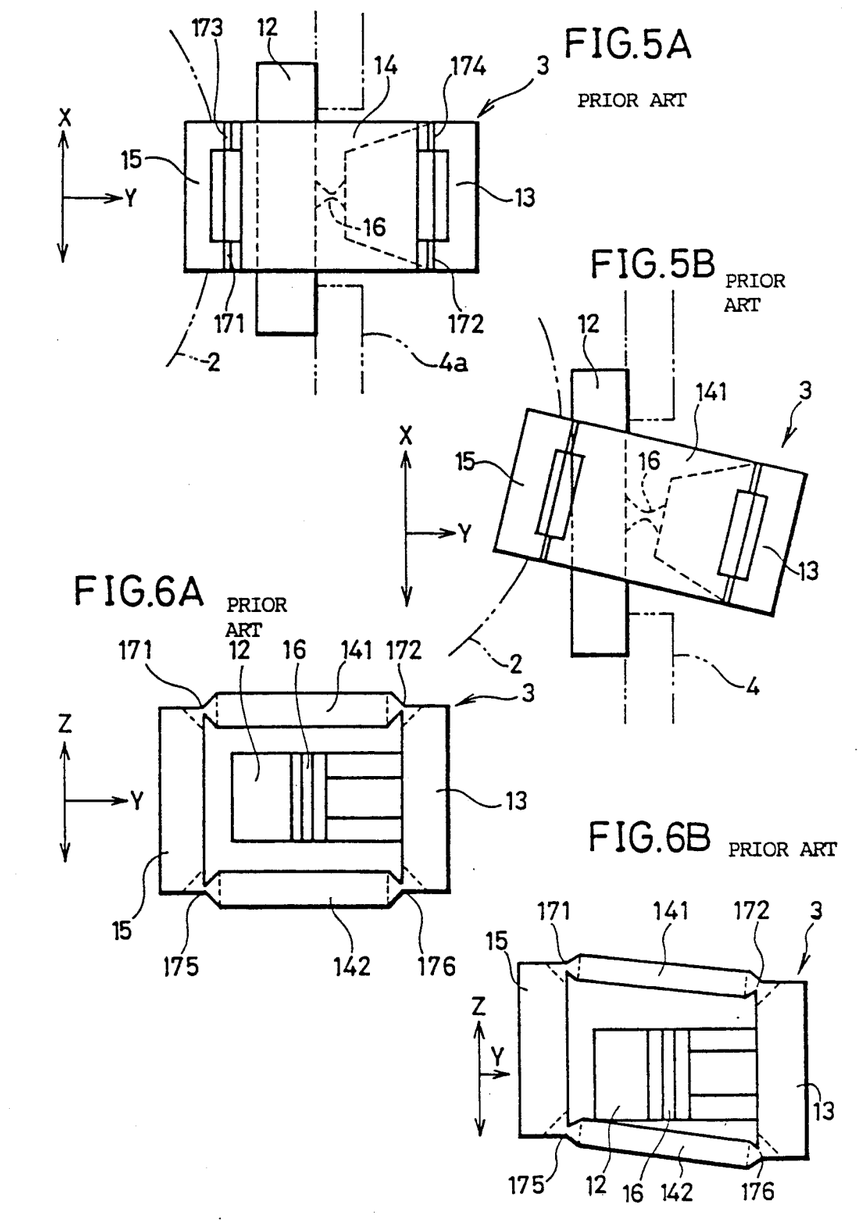
FIG. 5A is a plan view showing a movable supporting member forming a portion of an object lens driving device.
FIG. 5B is a plan view showing the state in which the movable supporting member is turned in the tracking direction.
FIG. 6A is a side elevational view showing the movable supporting member.
FIG. 6B is a side elevational view showing the movable supporting member when moved translationally in the focusing direction.

As shown in FIG. 5A and 6A, the movable supporting member 3 is supported on the base plate 4 through a securing member 12. The movable supporting member 3 may be cast integrally from resin or from resin and metal by, for example, insert molding. The movable supporting member 3 includes an intermediate supporting portion 13, connecting portions 141, 142 and a supporting portion 15. The securing member 12 includes a square bar extending in the tracking direction, that is, the direction shown by the arrow mark X. As shown in FIG. 2, this securing member 12 is secured to the base plate 4 by having its both end portions attached to the stand 4a. The intermediate supporting portion 13 is connected to the securing member 12 by a hinge 16 formed centrally on the lateral side of the securing member 12 as a rotation support section. The hinge 16 is a constricted connecting portion formed for extending in the focusing direction or the direction shown by the arrow mark Z. This hinge 16 exhibits resiliency in such a manner that the intermediate supporting portion 13 may be turned within the plane normal to the focusing direction, for the X-Y plane. The supporting portion 15 is connected to the intermediate supporting portion 13 by way of the connecting portions 141, 142. This connecting portions 141, 142 are provided for connecting the intermediate supporting portion 13 and the supporting portion 15 at the upper and lower positions along the focusing direction. The connecting portions 141, 142, the intermediate supporting portion 13 and the supporting portion 15 are connected to one another by link hinges 171, 172, 173, 174; 175, 176, 177, 178, with the link hinges 177 and 178 not being shown. The link hinges 171 to 178 are constricted connecting portions formed for extending in the tracking direction, that is, the direction shown by the arrow mark X. Each of the connecting portions formed by the link hinges exhibit resiliency such that it can be turned within a plane perpendicular to the tracking direction, that is, within the Y-Z plane. Thus, the intermediate supporting portions 13, connecting portions 141, 142 and the supporting portion 15 constitute a parallel link mechanism with the aid of these link hinges 171 to 178. As shown in FIGS. 2 and 4, the supporting portion 15 statically supports one end of the object lens holding member 2 in a direction perpendicular to the tracking direction, that is, the direction shown by the arrow mark Y. The supporting portion 15 is secured to one end of the object lens holding member 2, such as with the adhesive.

Referring to FIG. 5B, the above described movable supporting member 3 may be turned with respect to the securing member 12 about the hinge 16 as a fulcrum. Thus, the intermediate portion 13, connecting portions 141, 142 and the supporting portion 15 may be rotated partially. On the other hand, as shown in FIG. 6B, the supporting portion 15 may be translationally moved relative to the side of the securing member 12 and the intermediate supporting portion 13 by the parallel link mechanism constituted by the link hinges 171 to 178.

In the object lens driving device, when a predetermined current is supplied to the tracking coil 8, the object lens holding member 2 is turned in the tracking direction, that is, in the direction shown by the arrow mark X, about the hinge 16 of the movable supporting member 13 as the fulcrum. In this manner, tracking of the light beam irradiated on the optical disk through the object lens 1 may be adjusted as desired. On the other hand, when a predetermined current is supplied to the focusing coils 51, 52, the object lens holding member 2 is transitionally moved in the focusing direction, that is, in the direction shown by the arrow mark Z, by the parallel link mechanism constituted by the link hinges 174 to 178 of the movable supporting member 3. In this manner, focusing of the light beam radiated on the optical disk through the object lens 1 may be adjusted at desired.

However, in the above described object lens driving device, the center of gravity of the movable portions constituted by the object lens, object lens holding member and the driving coil is off the position of the rotary support section formed by the hinge 16. Thus, when the object lens driving device is tilted by the optical pickup device of FIG. 1 being tilted in its entirety with the optical disk, the movable portion turns round by its own gravity with the rotary support as the fulcrum. This causes a deviation in the amount of possible movement of the movable portion in the tracking direction. Also, depending on the tilt angle of the object lens driving device, there is the risk that the focusing coils 51, 52 and the magnets 61 to 64 are brought into physical contact with one another.

An object lens driving device in which the above problem is overcome by that the center of gravity of the movable portion is brought into register with the position of the rotary support section is disclosed in the Japanese Patent Laying Open Gazette No. 62-40627 (40627/1987). According to the object lens driving device shown in this patent publication, the movable portion is supported on the base plate by a member having a similar function to that of the above described parallel link mechanism and the rotary support section. The center of gravity of this movable portion is selected to be substantially coincident with the position of the rotary support section. Thus, when the object lens driving device is tilted, the movable portion is prevented from turning round with the rotary support as the fulcrum by its own gravity.

However, in the object lens driving device in which the center of gravity of movable portion is in register with the position of the rotary support section, account is not taken of the balancing of the moment of inertia of movable portion about the rotary support section. Thus the problem is presented that stable rotation of the movable portion for tracking control cannot be achieved.

In the above described partial rotation of the movable portion within the plane of X-Y, the rotational moment and the force acting on the movable portion may be explained by referring to FIG. 7. The position of the center of gravity G of the movable portion is off the position of the rotary axis 0, that is, the position of the rotary hinge 16. Thus, the gravity in the direction shown by the arrow mark Y is not balanced with respect to the position of the rotary axis 0. Thus, as shown in FIG. 7, the gravity Mg and the, gravity mg act at positions spaced by distances 1 and 2 from the position of the rotary axis 0. Since Mg>mg, the moment, Md=Mgl1—Mgl2 acts downwardly, so that the movable portion turns with the rotary hinge 16 as the fulcrum. This partial rotation of the movable portion is terminated by the force of resiliency of the rotary hinge 16. On the other hand, a driving force F produced by the electro-magnetic force causes partial rotation of the movable portion in the direction shown by the arrow mark Mr. At this time, the balanced position of moment of inertia of movable portion, that is, the position R showing the principal axis of inertia of movable portion is off the position of center of gravity G and off the position of the rotary axis 0. Thus, under the moment produced by the deviation in the gravity and the deviation of balance in the moment of inertia, a force f acts at the position of the rotary axis 0. This force f acts in the tracking direction on the movable portion.

In this manner, although the center of gravity G and the position of the rotational axis 0 are in register with each other in the above described object lens driving device disclosed in the Japanese Patent Laying Open No. 62-40627 (40627/1987), the balanced position of moment of inertia of movable portion R is still at the off position, so that the force f acts at the position of the rotary axis 0, that is, at the position of the rotary hinge 16. As a result, the problem is still presented that stable partial rotation of the movable portion about the position of the rotary support section 0 as the center cannot be achieved. However, when the rotary support section is formed of a rotary axis constituted by a supporting fulcrum and the rigidity of movable portion is large, it is substantially free from the effects by the force f, so that the above problem is overcome. In the conventional object lens driving device, the rotary support section is formed of a resilient material, such as the constricted portions of resin, so that it is flexed under the force f, with the resulting disadvantage that the partial rotation about the rotary support section 0 as the center becomes unstable.

SUMMARY OF THE INVENTION

It is an object of the present invention to provide an object lens driving device wherein stable partial rotation of the movable portion may be achieved without producing unnecessary force or force of rotation.

It is another object of the present invention to provide an object lens driving device wherein stable position control of the object lens may be achieved perceptually.

The object lens driving device according to the present invention includes a movable member, a base member, a hinge and rotational means. The movable member supports the object lens. The base member supports the movable member. The hinge interconnects the movable member and the base member and is formed of a resilient material. The rotational means are provided for affording relative partial rotation of the movable member with respect to the base member with the rotary axis passing through the hinges as the center. The rotational axis passing through the hinge member passes through the center of gravity of the movable member and a balanced position of moment of inertia of movable member.

According to a preferred embodiment of the present invention, the rotational means includes a magnetic driving section composed of electro-magnetic coils and a magnetic circuitry and adapted for driving the movable member in the rotational direction. The magnetic driving section may be disposed substantially symmetrically with respect to the axis of rotation. The electromagnetic coils may be attached to the movable member, while the magnetic circuitry may be magnets provided in opposition to the coil.

According to the present invention, the driving force causing partial rotation of the movable member acts as couple of forces about the hinge member as center. Thus the rotational moment centered about the hinge acts on the movable member. The rotational axis passing through the hinge passes through the center of gravity of the movable member. As a result, the moment of inertia about the hinge member is well-balanced, so that unnecessary force of rotation or force is not produced and stable partial rotation of the movable member may be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 8:
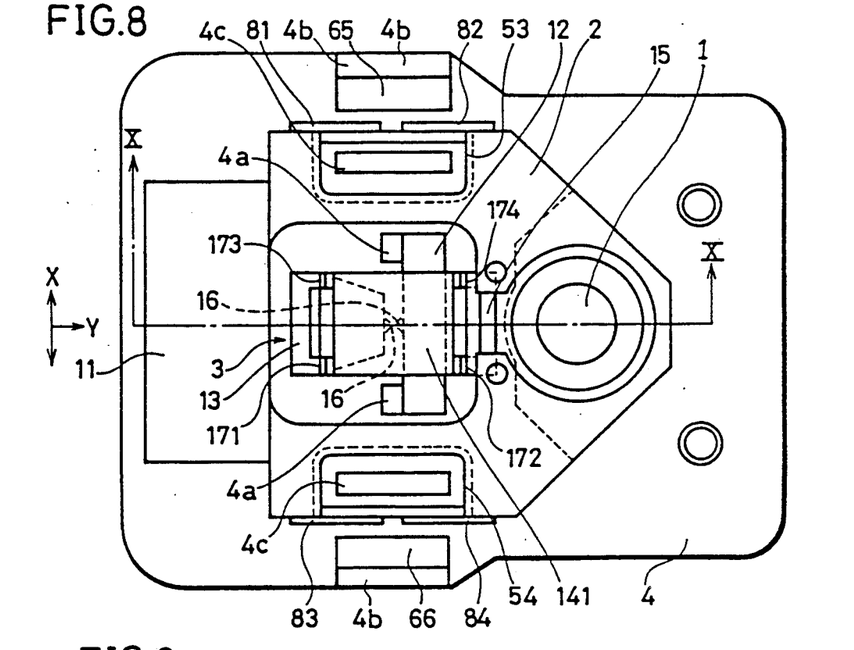
FIG. 8 is a plan view showing an embodiment of an object lens driving device according to the present invention.
Figure 9:
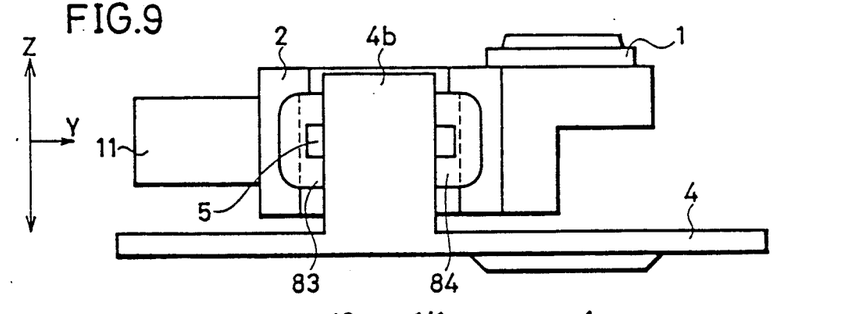
FIG. 9 is a side elevational view showing the object lens driving device according to the present invention.
Figure 10:
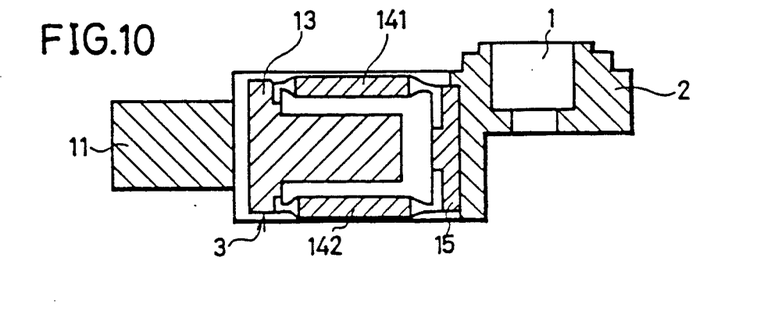
FIG. 10 is a partial sectional view taken along line X—X in FIG. 8.

An embodiment of the present invention will be explained by referring to FIGS. 8 to 11. In FIGS. 8 to 10, the parts or components having the same function as in the conventional device are designated by the same numerals.

An object lens 1 of an optical system disposed in a tabular container is held by having its peripheral portion secured to an object lens holding member 2. This holding member 2 is formed of a thermo plastic resin having a high melting point, such as the polyphenylene sulfide resin (PPS resin). The movable section is composed of focusing coils 53, 54 tracking coils 81, 82, 83, 84 and a counterbalance 11, in addition to the object lens 1 and the object lens holding member 2. This movable section is supported on a base plate 4 through a movable supporting member 3. The base plate 4 is attached to the foremost part of the main body of the optical pickup device. As shown in FIG. 1, the object driving device 400 is attached to the foremost part of the housing 300, so that a light beam is irradiated on the optical disk through the object lens.

The movable supporting member 3 supporting the movable section on the base plate 4 is similar in construction to the conventional member shown in FIGS. 5A, 5B, 6A and 6B. As shown in FIG. 5A and 6A, the movable supporting member 3 is supported on the base plate 4 through a securing member 12. The movable supporting member 3 is composed of an intermediate supporting portion 13, connecting portions 141, 142 and a supporting portion 15. The securing member 12 and the intermediate supporting portion 13 are resilient are interconnected by a rotary hinge 16 of resilient material, acting as the rotary support section. The connecting portions 141, 142, the intermediate supporting portion 13 and the supporting portion 15 are interconnected by link hinges 171 to 178, with the link hinges 177 and 178 not being shown. The securing member 12 is secured to the base plate 4 by having its both ends mounted to a stand 4a. The supporting portion 15 secures and supports the object lens holding member 2. As shown in FIG. 10, the supporting portion 15 is secured to one end of the object lens holding member 2 such as with an adhesive.

The intermediate supporting portion 13, connecting portions 141, 142 and the supporting portion 15 may be rotated by the rotary hinge 16 with respect to the securing member 2 on an X-Y plane which is perpendicular to the focusing direction shown by the arrow mark Z. The supporting portion 15 may be moved by a parallel link mechanism constituted by the link hinges 171 to 178 along the focusing direction with respect to the securing member 12 and the intermediate supporting portion 13. This movable supporting member 3 is cast integrally from a thermo plastic resin having a low melting point, such as polybutylene terephtalate resin (PBT).

The object lens 1 is held at one side end of the object lens holding member 2 along a Y direction perpendicular to the tracking direction. On the other hand, at one side end of the object lens holding member 2 along the Y direction perpendicular to the tracking direction, a large size recess is formed for extending to the vicinity of the object/lens 1. A counterbalance 11 having a parallelepiped form is provided for closing the opening of the recess. As shown in FIGS. 8 and 10, this counterbalance 11 is secured to the object lens holding member 2. The weight and the shape of the counterbalance 11 is selected so that the center of gravity of the movable section and the balanced position of moment of inertia of movable section, is disposed at the rotary hinge 16. Focusing coils 53, 54 are provided in both end recesses of the object lens holding member 2 along the tracking direction shown by the arrow mark X. Tracking coils 81, 82; 83, 84 are provided at proper intervals from each other on the lateral side formed by these focusing coils 53, 54 and the object lens holding member 2. In the inside of each of these focusing coils 53, 54, a yoke section 4c is provided on the base plate 4 with a spacing from each of these focusing coils 53, 54. Magnets 65, 66 are mounted with a spacing along the tracking direction shown by the arrow mark X from the driving coil formed by each of the focusing coil 53, 54 and each of the tracking coils 81, 82; 83, 84. These magnets 65, 66 are supported by a yoke sections 4b provided on both ends of the base plate 4. The magnets 65, 66 constitute a magnetic circuit along with the yoke sections 4b and 4c. The driving coils and the magnetic circuit are formed symmetrically about the rotational hinge 16 as the center.

In the above described object lens driving device, when the current is supplied to the focusing coils 53, 54, an electro-magnetic force is generated in the focusing direction shown by the arrow mark Z. This electro-magnetic force acts substantially at the position of center of gravity of the movable section. In this manner, the movable section is moved translationally along the focusing direction shown by the arrow mark Z by a parallel link mechanism constituted by the link hinges 171 to 178 of the movable supporting member 3. In this manner, focusing of the light beam irradiated through the object lens 1 on the optical disk may be adjusted as desired. On the other hand, when the current is supplied to the tracking coils 81 to 84, an electro-magnetic force is generated in the tracking direction shown by the arrow mark X. This electro-magnetic force acts on the movable section as couple of forces centered about the rotary hinge 16. This causes the movable section holding the object lens 1 to be turned in the tracking direction shown by the arrow mark X. In this manner, tracking of the light beam irradiated through the object lens 1 on the optical disk may be adjusted as desired.

Figure 11:
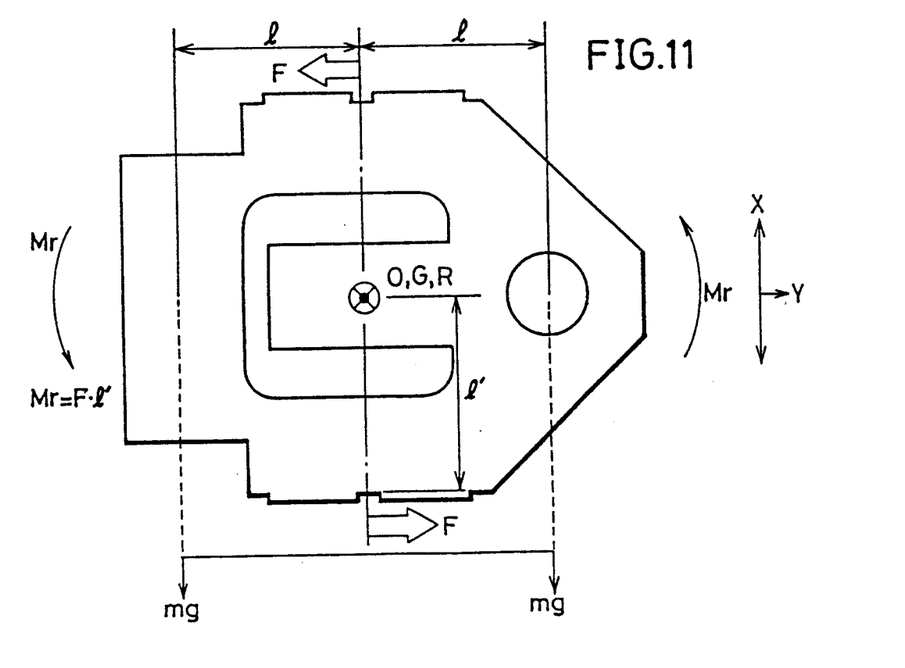
FIG. 11 is a plan view showing the moment and the force acting on the partially rotated movable portion of the object lens driving device of the present invention.

In the object lens driving device according to the present device, the rotational moment and the force acting on the movable section rotated partially in the tracking direction will be explained by referring to FIG. 11. The position of the rotational axis 0, the position of center gravity of the movable section G, and the balanced position of moment of inertia of movable section R are at the position of the rotational hinge 16. Thus, the gravitational forces mg spaced by the same distance 1 with respect to the position of the rotational axis 0 acts symmetrically. As a result, no such situation can arise in which the movable section turns round by the gravitational force about the rotational hinge 16. On the other hand, the electro-magnetic force produced by the tracking coils 81 to 84 and the magnets 65 to 66 acts as couple of forces in the direction shown by the arrow mark F about the rotational hinge 16 as center. As a result, the rotational moment acting on the movable section acts in the direction shown by the arrow mark Mr about the rotational hinge 16 as the center. Thus the center of balance of the rotational moment Mr produced by the driving force F causing partial rotation of the movable section is at the rotational hinge 16. As a result, stable partial rotation of the movable section about the rotational hinge 16 as a fulcrum may be achieved. That is, since no unnecessary force or force of rotation is produced during partial rotation of the movable section, stable position control of the object lens may be achieved perpetually.

What is claimed is:

1. An object lens driving device in which a movable section including an object lens is rotated partially on a plane perpendicular to an optical axis of said object lens about a resilient member which acts as a fulcrum comprising:
    a movable section including an object lens and a means for holding the object lens;
    a base member operatively connected to said movable section;
    a hinge member of a resilient material operatively connected between said movable section and said base member;
    rotational means for effecting relative rotation of said movable section with respect to said base member about a rotational axis passing through said hinge member; and
    balancing means for controlling the moment of inertia of said movable section so that a balancing position of the moment of inertia is located substantially directly at the rotational axis.

2. The object lens driving device according to claim 1, wherein said rotational means comprises a magnetic driving section including electro-magnetic coils and magnetic circuit means for driving said movable section along the direction of said rotation.

3. The object lens driving device according to claim 2, wherein said magnetic driving section is disposed substantially symmetrically with respect to said rotational axis.

4. The object lens driving device according to claim 3, wherein said electro-magnetic coils include coils connected to said movable section.

5. The object lens driving device according to claim 4, wherein said magnetic circuit means include magnets provided in opposition to said coils.

6. The object lens driving device according to claim 1, wherein said balancing means has a three dimension shape and is integrally attached to a holding member which is part of said movable section and has an end which is located opposite to the object lens with respect to the rotational axis, and locates the center of gravity of the movable section at a position located substantially at the rotational axis.

7. A driving device for an object lens in which a movable section including an object lens is rotated partially on a plane perpendicularly to an optical axis of the object lens about a resilient member which acts as a fulcrum, comprising:
 a movable section including an object lens;
 a base member operatively connected to said movable section;
 a hinge member of resilient material operatively connected between said movable section and said base member;
 rotational means for effecting relative rotational of said movable section with respect to said base member about a rotational axis passing through the center of said hinge member;
 said movable section including a movable member having a recess extending to said object lens; and
 a counterbalance located in said recess and secured to a holding member and extending beyond the holding member and being substantially parallel to said base member.

8. The device of claim 7 wherein said counterbalance has a parallelepiped device.

9. A driving device for an object lens comprising:
 a movable section including an object lens;
 a base member operatively connected to said movable section;
 a resilient hinge member operatively connected between said movable section and said base member;
 rotational means for effecting relative rotation of said movable section with respect to said base member about a rotational axis passing through said hinge member; and
 means for locating the center of gravity of the movable section and the balancing position of the moment of inertia of the movable section at substantially the same point.

* * * * *